(12) United States Patent
Balakrishnan et al.

(10) Patent No.: US 7,710,874 B2
(45) Date of Patent: May 4, 2010

(54) SYSTEM AND METHOD FOR AUTOMATIC MANAGEMENT OF MANY COMPUTER DATA PROCESSING SYSTEM PIPES

(75) Inventors: Ganesh Balakrishnan, Morrisville, NC (US); Everett A. Corl, Jr., Raleigh, NC (US); Clark D. Jeffries, Durham, NC (US); Ravinder K. Sabhikhi, Cary, NC (US); Michael S. Siegel, Raleigh, NC (US); Raj K. Singh, Cary, NC (US); Rama M. Yedavalli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1258 days.

(21) Appl. No.: 10/454,052

(22) Filed: Jun. 4, 2003

(65) Prior Publication Data

US 2004/0246976 A1 Dec. 9, 2004

(51) Int. Cl.
*H04L 1/00* (2006.01)
(52) U.S. Cl. ...................... 370/235; 709/230
(58) Field of Classification Search ................. 370/338
See application file for complete search history.

(56) References Cited

U.S. PATENT DOCUMENTS

2002/0120761 A1* 8/2002 Berg .......................... 709/230
2003/0041146 A1* 2/2003 Davis et al. .................. 709/227
2003/0223368 A1* 12/2003 Allen et al. ................. 370/235
2004/0039820 A1* 2/2004 Colby et al. ................ 709/226

OTHER PUBLICATIONS

Cioara et al., CCNA Exam Prep (Exam 640-802), Second Edition, Pearson Education, Inc., USA, pp. 19,28 (2008).

* cited by examiner

*Primary Examiner*—Seema S Rao
*Assistant Examiner*—Wanda Z Russell
(74) *Attorney, Agent, or Firm*—Mark E. McBurney; Schubert Osterrieder & Nickelson PLLC

(57) ABSTRACT

A process control method and system including partitioning transmit decisions and certain measurements into one logical entity (Data Plane) and partitioning algorithm computation to update transmit probabilities into a second logical entity (Control Plane), the two entities periodically communicating fresh measurements from Data Plane to Control Plane and adjusted transmit probabilities from Control Plane to Data Plane. The transmit probability may be used in transmit/discard decisions of packets or instructions exercised at every arrival of a packet or instruction. In an alternative embodiment, the transmit probability may be used in transmit/delay decisions of awaiting instructions or packets exercised at every service event.

25 Claims, 11 Drawing Sheets

SYSTEM AND METHOD FOR AUTOMATIC MANAGEMENT OF MANY COMPUTER DATA PROCESSING SYSTEM PIPES

CROSS REFERENCE TO RELATED APPLICATIONS AND PATENTS

The present invention relates to the following documents, all of which have been assigned to the assignee of the present invention and are fully incorporated by reference herein.

Patent application Ser. No. 10/405,673 filed Apr. 1, 2003, by Ganesh Balakrishnan, et al., entitled "Method and System for Managing Traffic within a Data Communication Network".

U.S. Pat. No. 6,404,752 filed Aug. 27, 1999, issued Jun. 11, 2002, entitled "Network Switch Using Network Processor and Methods".

Patent application Ser. No. 09/543,531, filed Apr. 6, 2000, by Brian M. Bass, et al., entitled "Full Match (FM) Search Algorithm Implementation for a Network Processor".

BACKGROUND OF THE INVENTION

1. Technical Field

The present invention relates to congestion management of information in computer systems and/or communications networks.

2. Prior Art

The use of flow control mechanisms and techniques for managing congestion in computer networks are well known in the prior art. The mechanisms and techniques are necessary to ensure that quality of service (QoS) obligations are maintained at all times including periods of congestion in the network. The QoS obligations are Service Level Contracts (SLC) between service providers and customers in which the customer pays and is promised (by the service provider) that the customer's data will have certain level of throughput in the network. Failure to provide the agreed upon throughput could result in the provider paying damages for breach of the SLC. To prevent this undesirable result, there is always a desire and need to provide more effective and efficient flow control mechanisms and methods.

In order to manage data and provide for QoS the flow control management is implemented in network devices (such as servers, routers, bridges, adapters, etc.) In particular data packets are placed into pipes or flows. The flow control management (device and method) control the rate at which data packets are moved from flows into a service queue for further processing.

A common prior art flow control of packets in computer networks is called Random Early Detection (RED). This function is positioned to be effective as packets arrive. A packet is called transmitted if the decision of flow control is to enqueue it in a buffer to await processing. A packet is called discarded if the decision of flow control is to delete it. Queue occupancy can be expressed as a fraction of total capacity; so 0 represents no packets awaiting processing and 1 represents complete use of the buffer to store packets. As queue length in the buffer grows from 0 to a threshold Lo>=0, RED at first transmits all packets into the queue. As queue occupancy exceeds Lo and increases further, a decreasing fraction of packets is transmitted into the queue. Finally, if occupancy reaches or exceeds a threshold Hi<=1, RED completely discards all arriving packets. In general 0<=Lo<=Hi<=1. The value of queue length in the buffer relative to these thresholds determines whether RED transmits or discards offered packets. For queue occupancy Q that is between Lo and Hi, the fraction T of packets transmitted can be a linear function of the following form:

$T(Q) = 1 - (1 - Tmin)*(Q-Lo)/(Hi-Lo)$; where * represents multiplication operator.

Here Tmin is a minimum transmitted fraction reached as Q increases to Hi. Many variations on this theme are practiced in the prior art; for example, Q might actually be an exponentially weighted moving average of queue occupancy. As another example, Lo=Hi, the special case known as taildrop flow control. That is, taildrop flow control calls for transmitting all packets if Q is less than Lo=Hi, otherwise transmitting no packets.

The use of multiple thresholds (weights) is called Weighted RED (WRED).

The use of RED or WRED (including many variants) unfortunately can imply some undesirable consequences including:

1. RED and WRED ignore rate of change of queue (queue going up, down)

2. High thresholds can cause high latency and lack of headroom for bursts

3. Low thresholds can cause burst-shaving (low utilization)

4. There is no direct relationship between thresholds and performance.

5. Administrative input can be needed to retune thresholds as offered loads change.

6. Hand-tuning thresholds is widely recognized as difficult.

7. Little or no guidance appears in vendor documents.

8. Bandwidth allocation for hierarchies of bandwidth limits cannot be easily provided.

9. Bandwidth allocation that respects priority cannot be easily provided.

A drawback of prior art techniques is that the decision to transmit or discard an arriving packet is made in the device based upon heuristically determined threshold or functions. A queue threshold has little or nothing to do with key characteristics of flows. Threshold flow control systems can also be subject to high queueing latency during even a small degree of oversubscription. In addition, the threshold has to be tuned manually. Another drawback with the prior art techniques is that they can control a relatively small number of flows. However, there are several applications in which the flow control management is called upon to manage thousands of pipes or flows.

In view of the above RED or WRED does not give a network administrator sufficient control to manage a computer network efficiently. As a consequence a system and method are required to provide the necessary control.

SUMMARY OF THE INVENTION

Quality of Service (QoS) in a computer system would include at least one class of workload with meaningful loss and latency guarantees. Conformant traffic (Premium traffic offered at a rate under its subscription guarantee, herein called min) should be at or very near 100% delivered with appropriate latency. If providing true QoS were easy to administer, a computer system with this capability would enjoy a substantial advantage over other computer systems that could only deliver QoS by inefficient underutilization of processing capacity or repeated trial-and-error tuning.

Some designers envision QoS with not two but thousands of Premium pipes, meaning various subscribers would be sold bandwidth service with min and max values. Any subscriber offering under its min would get low loss and latency, and any excess bandwidth would be predictably and efficiently allocated to subscribers offering traffic above their mins but below their maxs. Max would be enforced primarily to ensure network stability and responsiveness. Predictable allocation between min and max could mean, for example, that allocation is by strict precedence (discussed herein), so all packets of priority N are transmitted before any of priority N+1.

The problem is: how can many pipes, perhaps thousands of pipes, be allocated bandwidth correctly with minimal processor assets and computational complexity?

The present invention provides bandwidth allocation for many pipes and includes the following.

1. With period Dt, congestion, flow rate data and other flow characteristics are reported to a general purpose computer.

1a. Preferably, the report is provided by a special purpose computer such as the PowerNP Network Processor developed and marketed by IBM. The PowerNP processes data at media speed.

2. With the same period Dt, fresh transmit probabilities (Ti) are sent from the general purpose computer to a lookup engine for storage in the action portion of the lookup mechanism.

3. Packets at every arrival or instructions at every service event are recognized by the lookup mechanism.

4. The same lookup mechanism stores the transmit probability for each pipe as part of the action of the lookup. The storage could be in the leaves of the Patricia tree structure.

5. The expected time interval between packets or instruction service events is much shorter than Dt.

6. For intervals of duration Dt, every transmit decision by process control uses the same Ti compared to new random numbers. That is, there is a new random number for every packet or service event.

The lookup mechanism might be a Content Addressable Memory (CAM) device. Alternatively, the lookup mechanism might be a Direct Table and Tree with Leaves. In the latter case, a hash function might be applied to part or all of the packet or instruction to point to a location in the Direct Table. The direct table/tree structure mechanism and full match method of searching are identical to the ones set forth in the above Full Match patent application Ser. No. 09/543,531 which is incorporated herein by reference.

High bandwidth pipes can be handled at media speed by process control in the PowerNP. It is assumed that if there are many pipes, then most or all are of low bandwidth whose transmit probabilities Ti are calculated in the general purpose computer and forward to the PowerNP for further processing the low bandwidth flow. Thus, the present invention handles high bandwidth flows, low bandwidth flows and a mix of both (i.e. High bandwidth flow and low bandwidth flow).

The following pertains only to low bandwidth pipes or flows.

A transmit probability update algorithm every Dt time units will adjust Ti for pipei, that is, cause Ti to increase, decrease, or remain the same. The adjustment will depend upon processing queue occupancy, rate of change of processing queue occupancy, recent transmitted rate for pipei compared to mini and maxi, recent aggregate rates for aggregates containing pipei compared to respective aggregate maximums, precedence of pipei, and possibly other factors.

This information is passed to the algorithm for updating Ti with a period Dt or perhaps larger period if there is little activity in pipei. The set of information required to decide the adjustment for Ti is called the congestion information for pipei.

The invention can be partitioned into three Tasks.

Task 1. The transmit decision is per packet or per service event.

Task 2. The transmit probability update algorithm in the invention has constant period Dt.

Task 3. Congestion information for pipei is sent to a computer for adjusting Ti with period Dt or possibly a larger interval if there is little activity in pipei.

Here are the steps in Task 1.

Step 1.1. A packet or service event arrives.

Step 1.2. The packet or next instruction is recognized by a lookup mechanism as in pipei.

Step 1.3. Transmit probability Ti is read from the lookup mechanism.

Step 1.4. A fresh value R from a random number generator is read.

Step 1.5. If Ti >=R, then the action is: transmit frame to queue to await processing; else, discard packet or delay packet (skip service event).

Step 1.6. If the action is to transmit, then the transmit count for the current period Dt is incremented, possibly by one or possibly by the size of the packet if the rate is in bits per second.

Task 2 is transmit probability update by means of some algorithm. In a preferred embodiment, the algorithm described in patent application Ser. No. 10/405,673, incorporated herein by reference, is used.

For any transmit probability updated algorithm, needed first is a discussion of the period of transmit probability update, denoted Dt. For example, if the system contains 16000 (16K) pipes, with information for each pipe stored in a leaf of the lookup mechanism, then all 16K leaves are refreshed with a new transmit probability in round robin with period Dt. Control theory would suggest a conservative (small) value for Dt of one eighth of the quotient queue capacity/maximum possible fill rate. For example, this works out to about 4 ms if capacity is 128 Mb and fill rate is 4 Gbps. However, if the pipes are of low bandwidth, then statistics favor the assumption that it is unlikely that many pipes would go instantaneously from quiescent to full rate. Therefore, a Dt many times larger is probably a good design. For example, in the case that data store is 128 Mb and there are 16K pipes, a Dt value of 500 ms is probably appropriate.

For example, if the part processes Ethernet frames, then in one time interval Dt=500 ms for one 200 Kbps pipe we see

| Frame size | Number of frames per Dt |
|---|---|
| 64B | 200 |
| 1500B | 8 |

These are probably comfortable numbers for deducing pipe rate from a discrete time sample. A shorter Dt could result in inaccurate rate measurements and a longer Dt could result in depletion of the data store between updates.

Updating the transmit probabilities for 16K pipes every 500 ms means 32K updates per second. Each lookup action could include some or all of the following information:

1. a transmit probability (dynamic and adjusted every Dt time units or with greater period if activity in pipei is low)

2. a target port or next processor identification (possibly dynamic, possibly configured)

3. min bandwidth (could be a multiple of some configured amount such as a multiple of 16 Kbps)

4. max bandwidth (could be a multiple of some configured amount such as a multiple of 16 Kbps)

In the case of practicing the invention process control of packets or frames, the current transmitted bit count could be greatly simplified if all the frames in some pipes are known to be a certain size (such as voice). In such a case, it is only necessary to count transmitted frames.

Task 3 is congestion information update. Again in a preferred embodiment this is by means of methods in patent application Ser. No. 10/405,673 incorporated herein by reference.

In an example practice of the invention, a chip for Traffic Management only would be designed. It could use a CAM to find the frame-by-frame transmit probability decision (the most computational expensive task in the above design). A general purpose processor for running the process control algorithm would be needed, or dedicated hardware. Full pipe information could be stored in the CAM leaf, or in conventional memory, for use by the process control algorithm.

In one embodiment, values for pipei possibly including mini, maxi, precedence value, and previous Ti value for each pipe could be stored in the algorithm processor that runs the algorithm for adjusting Ti values. This would reduce the bandwidth required to send information from the lookup mechanism to the algorithm processor. Only congestion indication information and the identity of the pipe would be communicated to the algorithm processor.

In an alternative embodiment, the values for pipei possibly including mini, maxi, precedence value, and previous Ti value for each pipe could be stored in the lookup mechanism and sent along with congestion information for pipei to the algorithm processor that runs the algorithm for adjusting Ti values. This would reduce the information required to be stored in the algorithm processor.

The present invention allows indexed pipes that are arranged in administrative sets. Two aggregate administrative sets might intersect or might not intersect. Administrators may wish to allocate bandwidth hierarchically so that there are pipe-level guarantees and limits and in addition aggregate-level limits.

A time interval [t−Dt, t) is expressed relative to present time t and consists of all time that is greater than or equal to t−Dt but less than t. This interval is used to sample the bit rates of all flows. Sums of constituent flow rates are aggregate flow rates.

In the transmit/stall type of flow control, the value of Dt must be chosen small enough so that no physically possibly, sudden burst of demand could result in tardy reaction of flow control that violates guarantees.

DETAILED DESCRIPTION OF INVENTION

Figure 1:
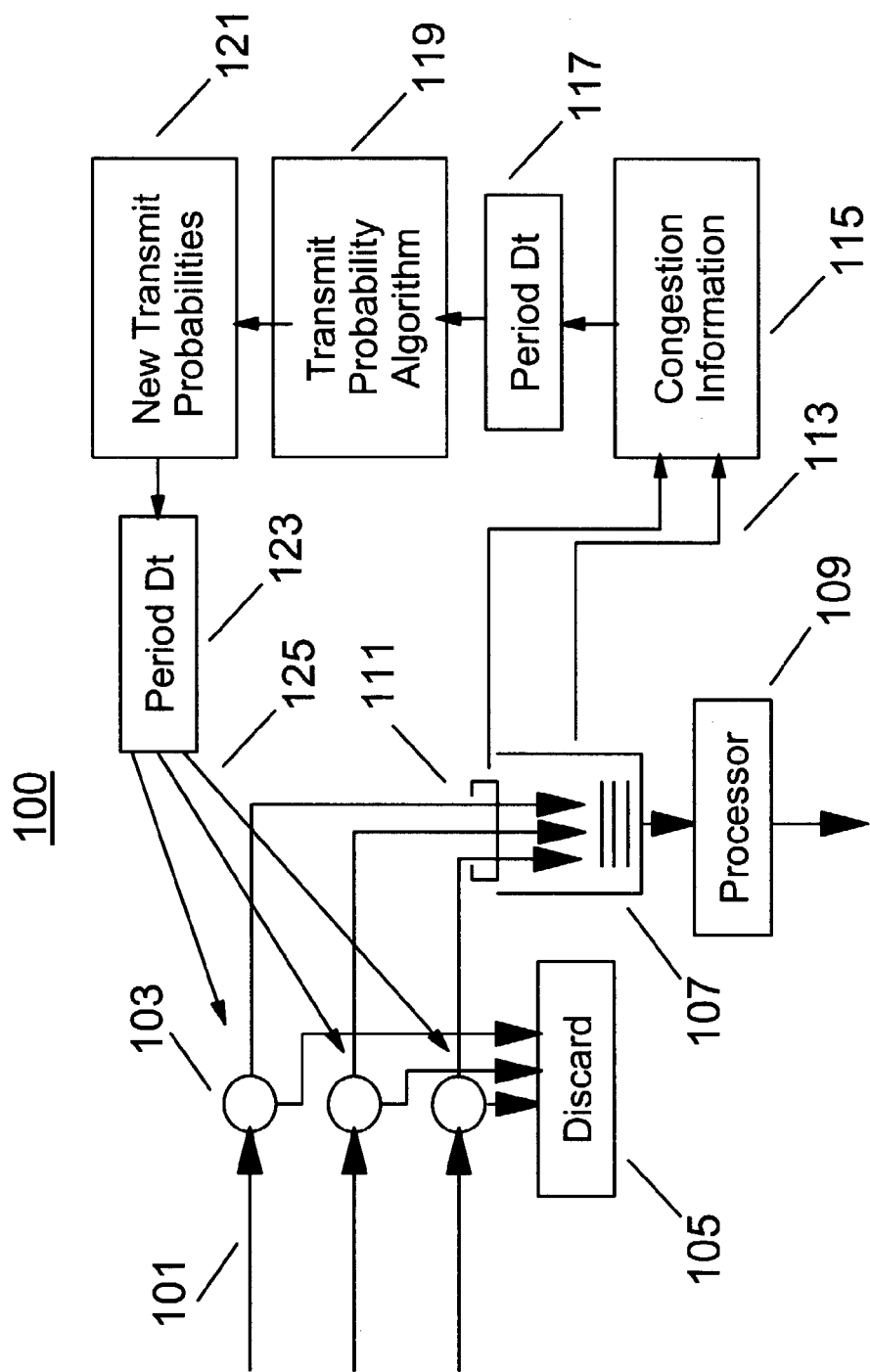
FIG. 1 shows a transmit/discard flow control that during congestion can control the occupancy of a processing queue by discarding proactively part of an offered load.

Before describing the invention in detail some definitions, description of environments and problems relative to the present invention will be given.

Computer information workloads can include packets (as routed in a communications network) or instructions (as supplied to a processor). Henceforth, packets or instructions are considered examples of information traffic. Congestion occurs when the arriving traffic rate or workload exceeds processing capacity.

Different traffic items may be classified into different classes of service with different economic values. In the present invention, a set of all the packets or instructions in a particular class passing through a particular processing bottleneck is called a pipe. When congestion arises, a graceful, predictable mechanism is needed to react to preserve guaranteed processing rates for premium traffic and to enforce maximum rates for some traffic classes. The same concepts are common to bottlenecks in a switch (at Layer 2 in the OSI model well known to those skilled in the art) or a router (at Layer 3). The concepts of congestion and class of service also pertain to a Network Interface Card (NIC), that is, a device that interfaces a network such as the Internet with an edge resource such as a server, cluster of servers, or server farm. For example, switch, router, or NIC might treat packets within one Virtual Local Area Network (VLAN) as having equivalent value when episodes of congestion arise. Any of these network nodes might also allow management of packets according to VLAN Virtual Port (VP) membership, for example, imposing a maximum limit on the bandwidth of all VLANs in a VP (Virtual Pipe). The present invention applies to a network node that can be a switch, a router, NIC, or, more generally, a machine capable of classifying, switching, routing, policing functions, or other security functions based upon classification results, including management of packets according to VLAN or VP membership and current congestion conditions. This may be appropriate to Grid computing in which the numbers of nodes, packets, and pipes are possibly large.

More generally still, in the operation of storage networks reaction to congestion can take the form of rate control. This means that packets are simple stalled momentarily in a queue as opposed to being discarded. In some storage networks latency is not the primary issue. Rather, zero loss can be desired. In this case the rate at which packets are sent from a sending unit is modulated. The present invention provides rate control applicable to storage networks. This may again be appropriate to Grid computing in which the numbers of nodes, packets, and pipes are possibly large.

In yet another instance, processing of computer instruction workloads submitted to a processor can become congested. Herein instructions are the logical information units, not packets. The goal can be momentary stalling of processing of instructions of one type (in one pipe) and transmitting instructions in another pipe to the processor for the sake of enforcing instruction processing guarantees or precedences. Instruction can be stalled, not discarded, in general. The present invention provides rate control applicable to instruction processing. This may yet again be appropriate to Grid computing in which the numbers of nodes, instructions, and pipes are possibly large.

For the sake of brevity, in the following the concepts flow control (transmit or discard packets into a processing buffer) and rate control (transmit or delay packets into a processing buffer, or transmit or delay instructions into a processing buffer) are all called simply process control. In the case of information in the form of packets the present invention provides a probability for the transmit/discard decision or the transmit/delay decision. In the case of information in the form of instructions, the present invention provides a probability for the transmit/delay decision.

Concepts common to process control requirements include a minimum bandwidth guarantee (min). If the offered rate of a pipe is steady and below its min, then all of the packets or instructions of the pipe should be transmitted into the queue of a processor. Another concept is a maximum bandwidth limit (max). If the offered rate of a pipe is steady and if its transmitted rate is above its max, then the fraction of transmitted packets of the process control should decrease by exercising a discard mechanism or a stall mechanism until the transmitted rate is below its max. Another possible requirement of process control administration is aggregate bandwidth limit, a hierarchical concept. If the offered rate of a pipe is steady, if its transmitted rate is between its min and max, and if the sum of the transmitted rate and the transmitted rates of other pipes within an aggregate of pipes is consistently above a maximum value for that aggregate of pipes, then the transmitted rate of the pipe should be reduced.

Yet another concept is precedence. If the offered rate of a pipe is steady, if its transmitted rate is between its min and max, and if it is a member of a set of pipes with aggregate transmitted rate above an aggregate maximum value, then the amount of excess bandwidth the pipe should receive can be in accordance with its precedence so that all of the packets of a Green (high value) pipe get service before any of the packets of a Yellow (moderate value) pipe get service, and all of the packets of a Yellow pipe get service before any of the packets of a Red (low value) pipe. Again, precedence only applies to pipes between their min and max values.

The above reasoning indicates a need to use automatic process control to replace conventional methods. This need becomes especially acute if a large number (thousands) of pipes are present. If it is possible for a given combination of pipe workloads to provide an allocation that meets all min, max, aggregate max, and precedence criteria (that is, a correct bandwidth allocation), then an automatic process control system should automatically do so. An automatic process control system should also achieve high utilization and, during steady offered loads, low queue occupancy. Furthermore, an automatic process control should converge quickly to a new, correct equilibrium as offered loads change, and no threshold tuning or other trial-and-error adjustments should involved. Finally, an automatic process control should be able to handle a large number (thousands) of pipes with low computational expense. The present invention achieves these goals.

At discrete time intervals of constant, configured length Dt, the value of a transmit probability T for each pipe is calculated. An algorithm for refreshing transmit probabilities is included in the present invention. The transmit probability T is compared to a the current value of a random number generator every time a packet arrives during the time interval Dt. The packet is transmitted if the value of T is greater than or equal to the current value of the random number generator. The packet is discarded if the value of T is less than the random number. The present invention includes for each process control a new method and system for calculating for each pipe a transmit probability T. Just as pipes can be labeled by integers i=0, 1, 2, 3, . . . , as pipe0, pipe1, pipe2, pipe3, . . . , so can the corresponding transmit probabilities be labeled T0, T1, T2, T3, . . . .

In the context of transmit/discard decisions for packets, Ti will be the probability that an arriving packet will be transmitted into the processing queue (as opposed to discarded). In terms of transmit/stall flow control for packets, Ti will be the probability at a given service event that a waiting packet will be sent from a queue for waiting packets to the processing queue (as opposed to not served and therefore stalled). In terms of transmit/stall rate control for instructions, Ti will be the probability at a given service event that a waiting instruction will be sent from a queue for waiting packets to the processing queue (as opposed to not served and therefore stalled). In the following, each of the three types of probability of transmission is simply called a transmit probability for a process control.

The present invention calculates at time t the value T(t+Dt) of transmit probability to use during the time interval [t, t+Dt) by application of an algorithm. The inputs to the algorithm for each pipe, for example pipei, include the previous transmit probability Ti(t) for pipei used during the interval [t−Dt, t), the current processing queue level at time t and the previous queue level at time t−Dt, the recent transmitted pipe rate fi of pipei over the interval [t−Dt, t), the values mini and maxi for pipei, the precedence value of pipei, and, for each aggregate j containing pipei, the recent aggregate rate of all pipes in aggregate j compared to the corresponding aggregate maximum aggj.

FIG. 1 shows a transmit/discard process control system 100. An offered load 101 is a sequence over time of arriving packets. Process control 103 recognizes the pipe membership of a packet and makes a decision to transmit or discard the packet. If the decision is to discard the packet, then the packet is sent to a discard mechanism 105, and after a short delay the memory resources used by the packet are free for use by other arriving packets. If the decision is to transmit the packet, then the packet is enqueued in a buffer 107. The transmitted rate is measured 111 by a device. Eventually the packet appears at the head of the queue 107 and is sent to a processor 109 for further processing. The occupancy of the queue 107, the rate of change of the occupancy of the queue 107, and the transmitted rates are generated and sent via transmit channel 113 into an array of congestion information stored in storage 115. A mechanism with periodic trigger 117 starts an algorithm in a computer 119 that uses congestion information from storage 115 to compute and store new transmit probabilities 121. A mechanism with periodic trigger 123 sends the fresh transmit probabilities through a communications channel 125 to the transmit/discard process controls 103.

Figure 2:
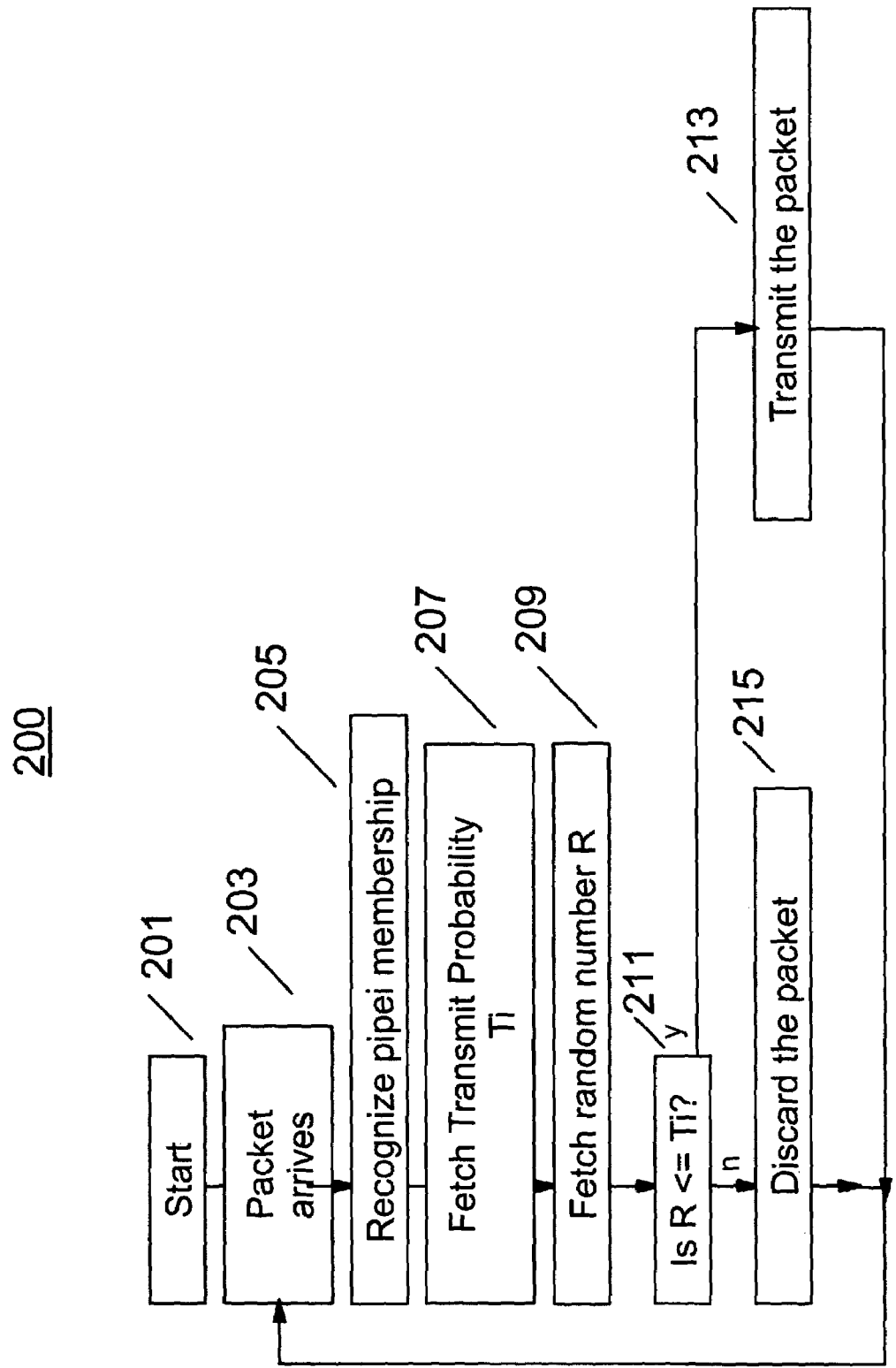
FIG. 2 shows a flowchart of a program controlling the mechanism within the transmit/discard component 103 of FIG. 1. At the arrival of each packet a decision to transmit the packet into a processing queue or to discard the packet is made with this mechanism.

FIG. 2 shows an operational flowchart 200 of the mechanism within the process control 103. The flow starts 201 and a packet arrives 203. The packet is recognized for pipe membership 205. A transmit probability Ti for the pipe is fetched 207. Also the current value of a random number R is fetched 209. The values of Ti and R are compared 211, and if R<=Ti, then the mechanism branches to block 213. Else the mechanism branches to block 215. In block 213 the actions corresponding to transmitting the packet to the processing queue are taken. In block 215 the actions corresponding to discarding the packet are taken. Then the mechanism returns to 203 for the arrival of the next packet.

Figure 3:
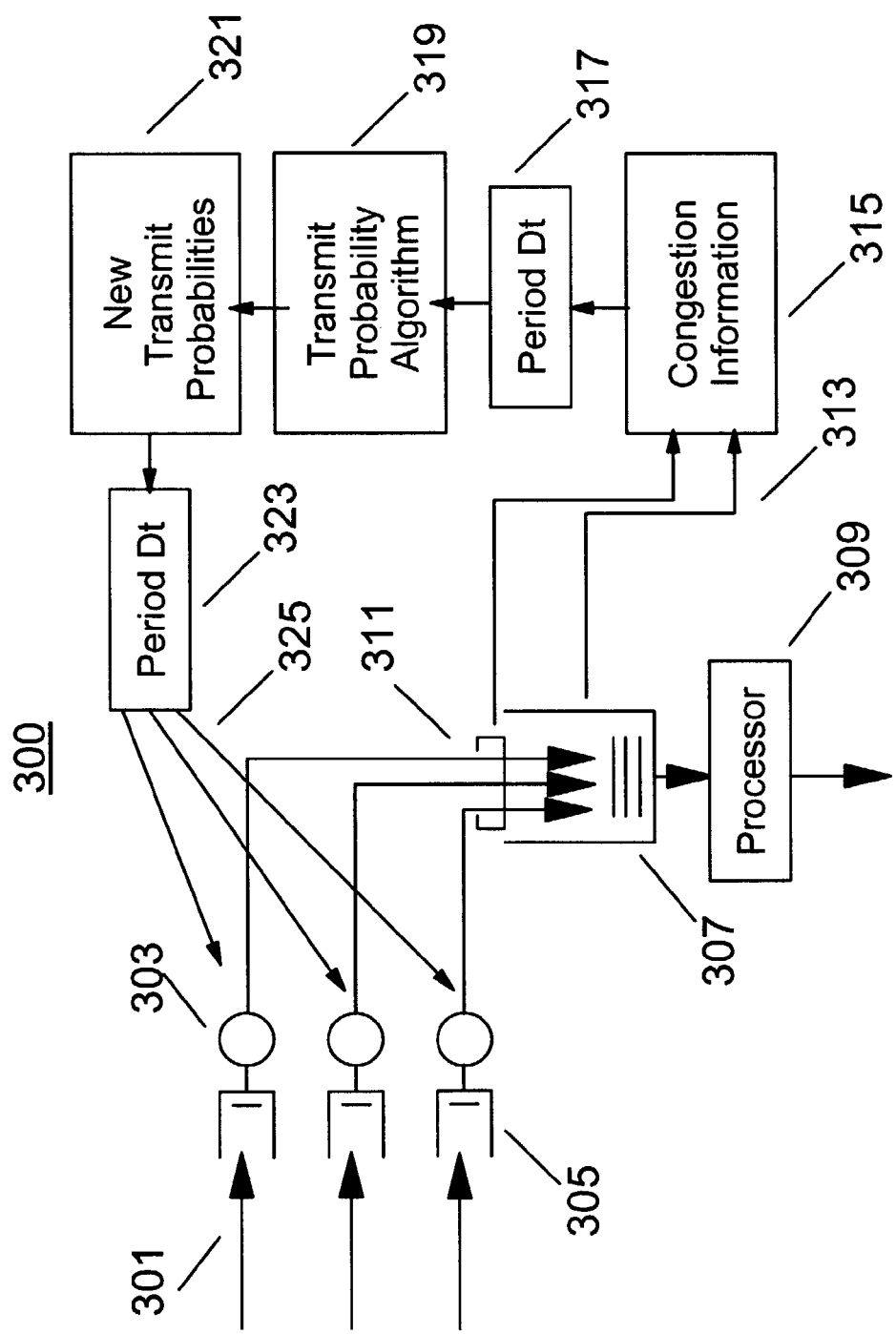
FIG. 3 shows a transmit/stall flow control that during congestion can control the occupancy of a processing queue by delaying proactively part of an offered load.

FIG. 3 shows transmit/delay process control 300. An offered load 301 is a sequence over time of instruction or packets awaiting in respective queues 305. Process control 303 recognizes the pipe membership of an instruction or packet and, at every service event, makes a decision to transmit or delay the instruction or packet at the head of the queue 305. If the decision is to delay the instruction or packet, then the service event is skipped. If the decision is to transmit the packet, then the instruction or packet is enqueued in a buffer 307. The transmitted rate is measured by a device 311. Eventually the instruction or packet appears at the head of the queue 307 and is sent to a processor 309 for further processing. The occupancy of the queue 307, the rate of change of the occupancy of the queue 307, and the transmitted rates 311 are determined and sent via transmit channel 313 into an array of congestion information in storage 315. A mechanism with periodic trigger 317 starts an algorithm in a computer 319 that uses congestion information 315 to compute and store new transmit probabilities 321. A mechanism with periodic trigger 323 sends the fresh transmit probabilities through a communications channel 325 to the transmit/discard process controls 303. The transmit probability algorithm can be the one set forth in the above referenced application which is incorporated in its entirety herein or any of the suitable algorithms.

Figure 4:
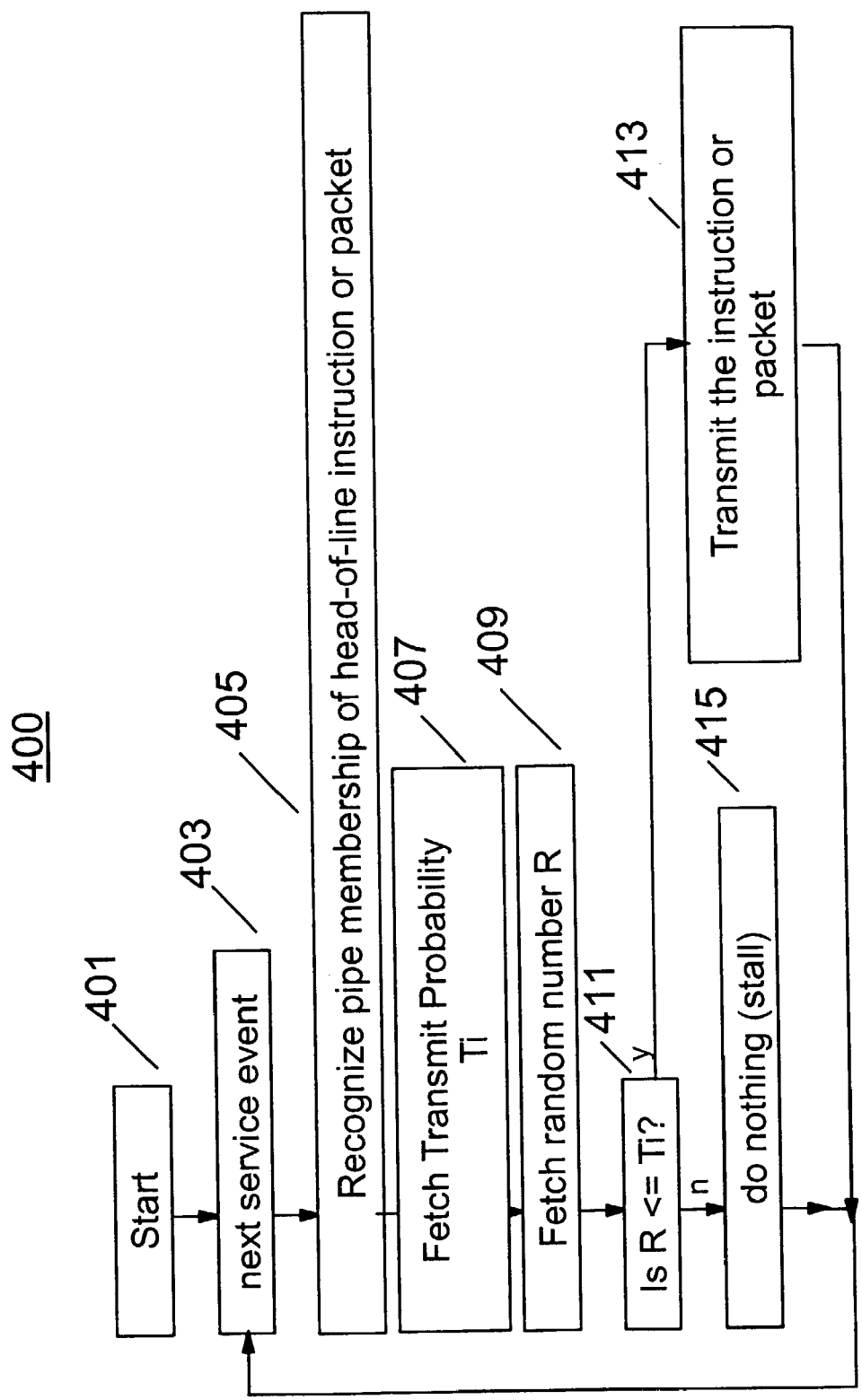
FIG. 4 shows a flowchart of a program controlling the mechanism within the transmit/delay component 303 of FIG. 3. At the arrival of each service event, a decision to transmit the next instruction or packet waiting in each pipe into a processing queue or to skip the service event (delay the instruction or packet) is made with this mechanism.

Referring to FIG. 4 a flowchart for the mechanism within the process control 303 of FIG. 3 is given. The flowchart starts 401 and a service event occurs 403. The head-of-line instruction or packet awaiting processing is recognized for pipe membership 405. A transmit probability Ti for the pipe is fetched 407. Also the current value of a random number R is fetched 409. The values of Ti and R are compared 411, and if R<=Ti, then the mechanism branches to block 413. Else the mechanism branches to block 415. In block 413 the actions corresponding to transmitting the packet to the processing queue are taken. In block 415 the actions corresponding to skipping the service event (do nothing) are taken. Then the mechanism returns to 403 for the occurrence of the next service event.

It should be noted that although the flow control mechanisms are shown as functional discrete blocks in FIGS. 1 and 2 in an actual implementation a special purpose computer such as the PowerNP Network Processor, developed and marketed by IBM could be used. This Network Processor includes an embedded processor complex and other facilities that process packets at media speed.

Figure 5:
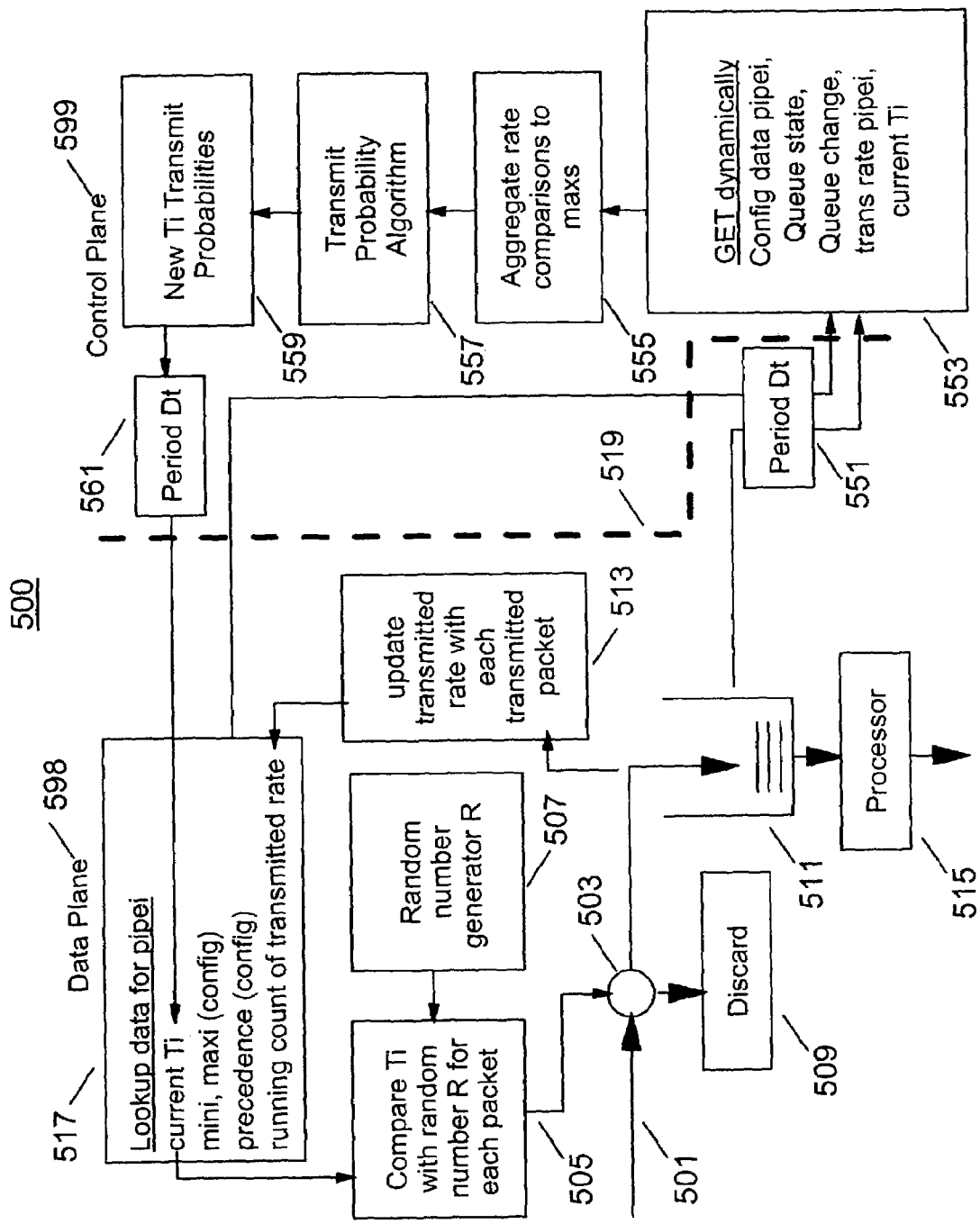
FIG. 5 depicts a transmit/discard process control, according to teachings of the present invention, in which there is a partition between the Data Plane and the Control Plane. A specialized computer such as the PowerNP processes data in the data plane whereas a general computer calculates Ti for low bandwidth flows in the control plane.

Referring to FIG. 5, transmit/discard process control 500 as taught by the present invention is depicted. The entire mechanism is partitioned into a Data Plane 598 and a Control Plane 599 by a logical partition 519 across which information is passed. The portion of the mechanism in the Data Plane 598 can be implemented in a Network Processor whereas the portion of the mechanism in the Control Plane 599 can be implemented in a general purpose computer. An offered load 501 is a sequence over time of arriving packets in one or more sources (only one is shown for clarity). Process control 503 recognizes the pipe membership of a packet and makes a decision to transmit or discard the packet. Process control 503 obtains the appropriate transmit probability Ti for a packet in pipe i from a lookup mechanism 517. The transmit/discard decision is made in a comparitor 505 that fetches Ti and the current value R of a random number generator 507. If the decision is to discard the packet, then the packet is sent to a discard mechanism 509, and after a short delay the memory resources used by the packet are free for use by other arriving packets. If the decision is to transmit the packet, then the packet is enqueued in a buffer 511. The transmitted rate is measured by a counter 513 and recorded in the data structure in lookup mechanism 517. Eventually the packet appears at the head of the queue 511 and is sent to a processor 515 for further processing. A periodic communications device 551 with period Dt sends across an interface 519 from the Data Plane 598 to the Control Plane 599 certain values for every pipe index i. The sent values may include the current transmit probability Ti. The sent values may also include configuration values such as the pipe minimum bandwidth (guarantee mini), the pipe maximum bandwidth (limit maxi), and the pipe precedence (an integer=0, 1, 2, 3, . . . ). The sent values may also include measured values such as the current transmitted rate of pipe i in 517 as well as the occupancy of the queue 511 and the rate of change of the occupancy of the queue 511. All the values are sent into an array of information in storage 553. Transmitted rates are then made available to a comparison mechanism 555 that computes aggregate rates and compares them to configured aggregate limits stored in 555. Then the information in 555 starts an algorithm in a computer 557 that uses information from 553 and 555 to compute and store new transmit probabilities in an array in storage 559. The new transmit probability values are sent by an information system 561 with periodic trigger through the logical partition 519 from the Control Plane 599 to the lookup mechanism 517 in Data Plane 598. The lookup mechanism could include a Patricia tree structure for storing data and a microprocessor that search the tree structure.

Figure 6:
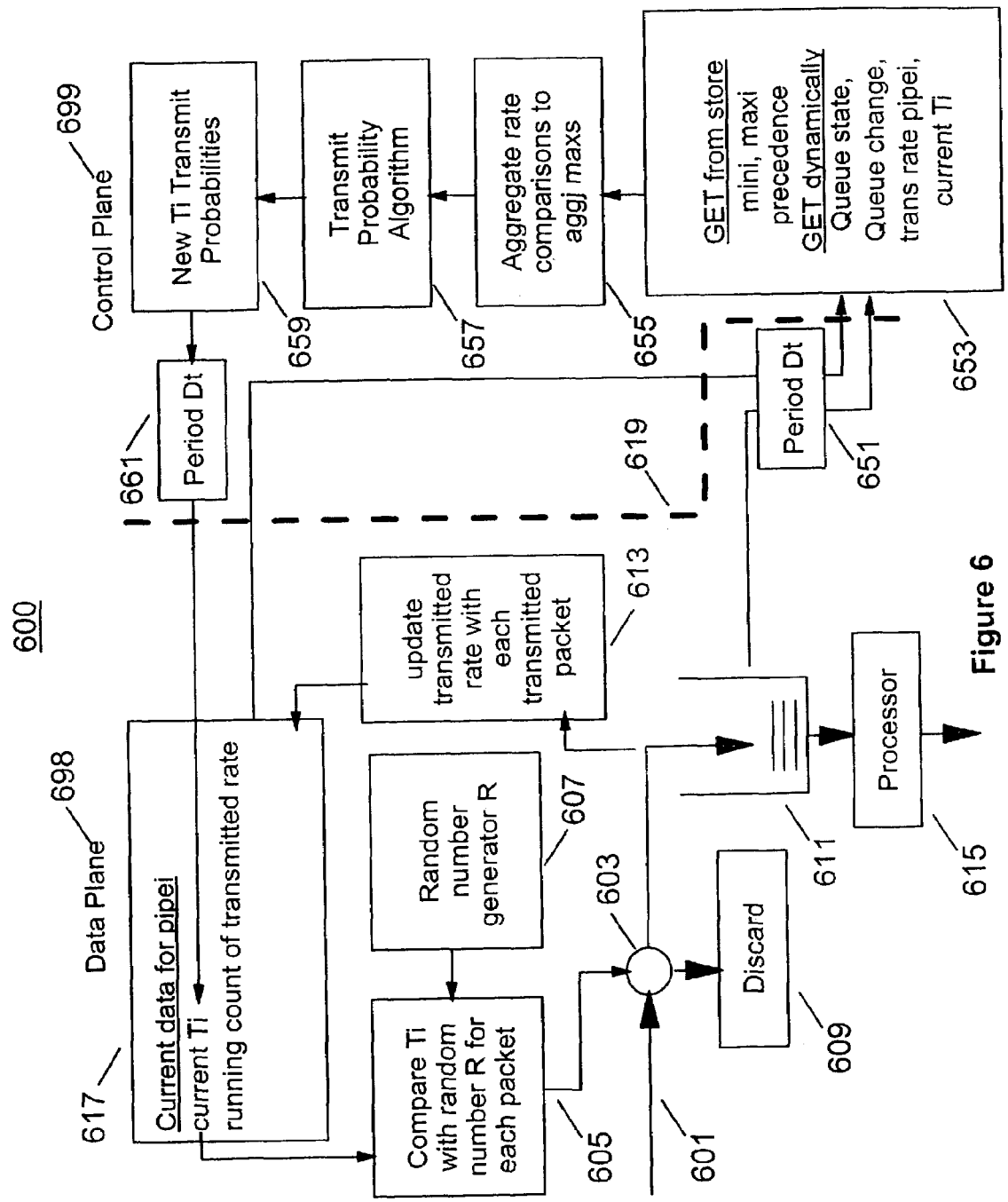
FIG. 6 depicts a transmit/discard process control, according to the teachings of the present invention, in which there is a partition between the Data Plane and the Control Plane. One lookup mechanism recognizes packet pipe membership and supplies the current transmit probability and stores a running measurement of transmitted rate. Periodically all the information is sent through to the Control Plane. Configuration information for each pipe is kept in the Control Plane. A general purpose computer in the Control Plane calculates new transmit probabilities and sends them back to the Data Plane.

Referring to FIG. 6, transmit/discard process control 600 as taught by an alternative embodiment of the present invention is depicted. The entire mechanism is partitioned into a Data Plane 698 and a Control Plane 699 by a logical partition 619 across which information is passed. An offered load 601 is a sequence over time of arriving packets in one or more sources (only one is shown for clarity). Process control 603 recognizes the pipe membership of a packet and makes a decision to transmit or discard the packet. Process control 603 obtains the appropriate transmit probability Ti for a packet in pipe i from a lookup mechanism 617. The transmit/discard decision is made in a comparitor 605 that fetches Ti and the current value R of a random number generator 607. If the decision is to discard the packet, then the packet is sent to a discard mechanism 609, and after a short delay the memory resources used by the packet are free for use by other arriving packets. If the decision is to transmit the packet, then the packet is enqueued in a buffer 611. The transmitted rate is measured by a counter 613 and recorded in the data structure in 617. Eventually the packet appears at the head of the queue 611 and is sent to a processor 615 for further processing. A periodic communications device 651 with period Dt sends across an interface 619 from the Data Plane 698 to the Control Plane 699 certain values for every pipe index i. The sent values may include the current transmit probability Ti. The sent values may also include measured values such as the current transmitted rate of pipe i in 617 as well as the occupancy of the queue 611 and the rate of change of the occupancy of the queue 611. All the values are sent into an array of information in storage 653. In this embodiment, the array of information in 653 may also include configuration values such as the pipe minimum bandwidth (guarantee mini), the pipe maximum bandwidth (limit maxi), and the pipe precedence (an integer=0, 1, 2, 3, . . . ). Transmitted rates are then made available to a comparison mechanism 655 that computes aggregate rates and compares them to configured aggregate limits stored in 655. Then the information in 655 starts an algorithm in a computer 657 that uses information from 653 and 655 to compute and store new transmit probabilities in an array in storage 659. The new transmit probability values are sent by device 661 with periodic trigger Dt through the logical partition 619 from the Control Plane 699 to the lookup mechanism 617 in Data Plane 698.

Figure 7:
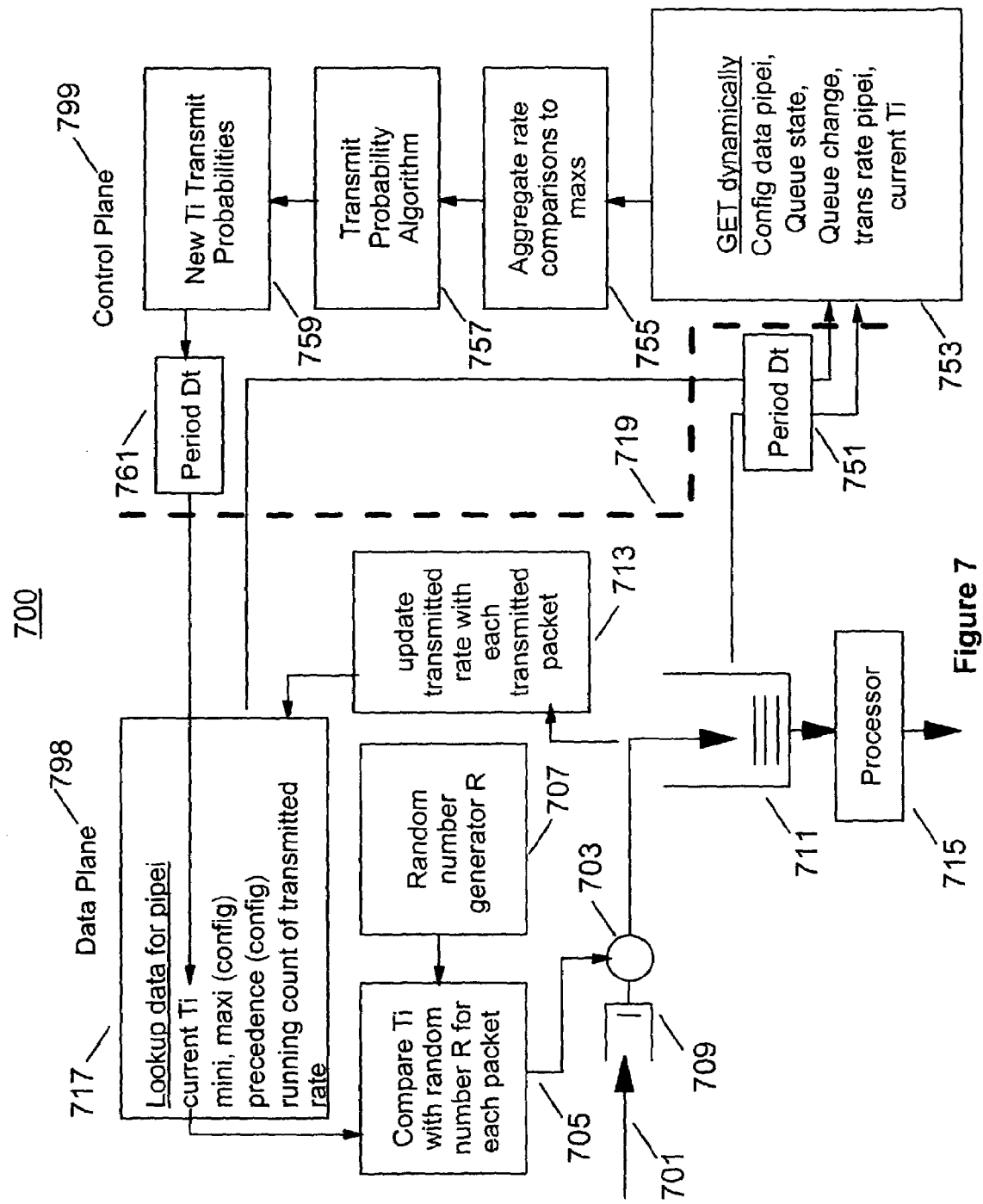
FIG. 7 depicts a transmit/delay process control in which there is a partition between the Data Plane and the Control Plane. One lookup mechanism recognizes packet pipe membership and supplies the current transmit probability, configuration data, and a running measurement of transmitted rate. Periodically, all the information is sent through to the Control Plane. A general purpose computer in the Control Plane calculates new transmit probabilities and sends them back to the Data Plane.

Referring to FIG. 7, transmit/delay process control 700 as taught by another embodiment of the present invention is depicted. The entire mechanism is partitioned into a Data Plane 798 and a Control Plane 799 by a logical partition 719 across which information is passed. An offered load 701 is a set of enqueued instructions or packets in one or more queues 709, possibly physically remote from the other parts of the Data Plane. At every service event, process control 703 recognizes the pipe membership of the instruction or packet at the head of each queue 709 and makes a decision to transmit or delay the instruction or packet. Process control 703 obtains the appropriate transmit probability Ti for an instruction or packet in pipe i from a lookup mechanism 717. The transmit/delay decision is made in a comparitor 705 that fetches Ti and the current value R of a random number generator 707. If the decision is to delay the instruction or packet, then the service event is skipped (do nothing). If the decision is to transmit the packet, then the instruction or packet is enqueued in a buffer 711. The transmitted rate is measured by a counter 713 and recorded in the data structure in lookup mechanism 717. Eventually the packet appears at the head of the queue 711 and is sent to a processor 715 for further processing. A periodic communications channel device 751 with period Dt sends across an interface 719 from the Data Plane 798 to the Control Plane 799 certain values for every pipe index i. The sent values may include the current transmit probability Ti. The sent values may also include configuration values such as the pipe minimum bandwidth (guarantee mini), the pipe maximum bandwidth (limit maxi), and the pipe precedence (an integer=0, 1, 2, 3, . . . ). The sent values may also include measured values such as the current transmitted rate of pipe i in 717 as well as the occupancy of the queue 711 and the rate of change of the occupancy of the queue 711. All the values are sent into an array of information at storage 753. Transmitted rates are then made available to a comparison mechanism 755 that computes aggregate rates and compares them to configured aggregate limits stored in 755. Then the information in 755 starts an algorithm in a computer 757 that uses information from 753 and 755 to compute and store new transmit probabilities in an array in storage 759. The new transmit probability values are sent by device 761 with periodic trigger through the logical partition 719 from the Control Plane 799 to the lookup mechanism 717 in Data Plane 798. The algorithm in 757 that calculates the transmit probability Ti can be the algorithm in the related patent application set forth above or any other appropriate one.

Figure 8:
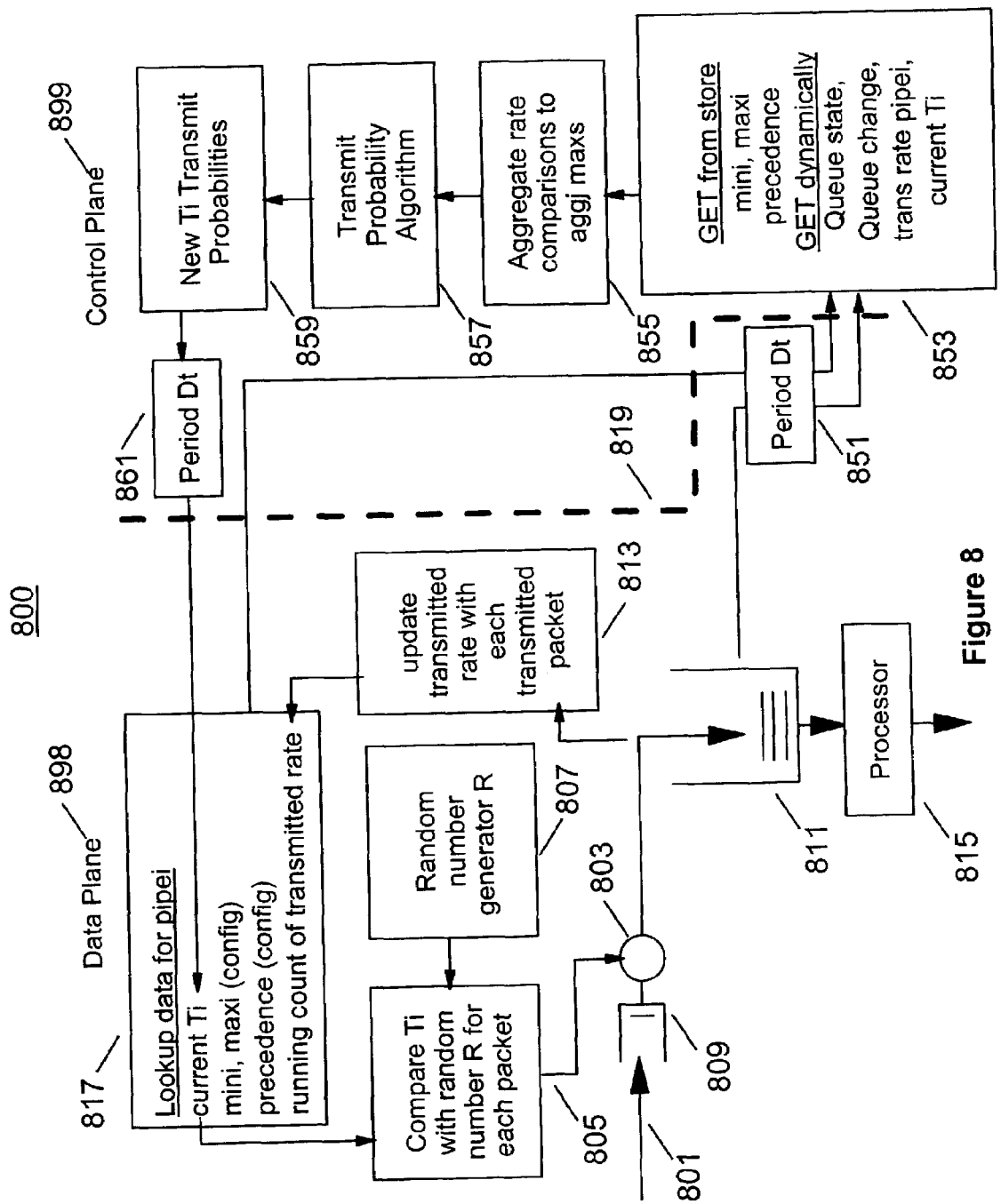
FIG. 8 depicts a transmit/delay process control in which there is a partition between the Data Plane and the Control Plane. One lookup mechanism recognizes packet pipe membership and supplies the current transmit probability and stores a running measurement of transmitted rate. Periodically all the information is sent through to the Control Plane. Configuration information for each pipe is kept in the Control Plane. A general purpose computer in the Control Plane calculates new transmit probabilities and sends them back to the Data Plane.

Referring to FIG. 8, transmit/delay process control mechanism or system 800 as taught by yet another embodiment of the present invention is depicted. The entire mechanism is partitioned into a Data Plane 898 and a Control Plane 899 by a logical partition 819 across which information is passed. An offered load 801 is a set of enqueued instructions or packets in one or more queues 809, possibly physically remote from the other parts of the Data Plane. At every service event, process control 803 recognizes the pipe membership of the instruction or packet at the head of each queue 809 and makes a decision to transmit or delay the instruction or packet. Process control 803 obtains the appropriate transmit probability Ti for an instruction or packet in pipe i from a lookup mechanism 817. The transmit/delay decision is made in a comparitor 805 that fetches Ti and the current value R of a random number generator 807. If the decision is to delay the instruction or packet, then the service event is skipped (do nothing). If the decision is to transmit the packet, then the packet is enqueued in a buffer 811. The transmitted rate is measured by a counter 813 and recorded in the data structure in storage 817. Eventually the packet appears at the head of the queue 811 and is sent to a processor 815 for further processing. A periodic communications channel 851 with period Dt sends across an interface 819 from the Data Plane 898 to the Control Plane 899 certain values for every pipe index i. The sent values may include the current transmit probability Ti. The sent values may also include measured values such as the current transmitted rate of pipe i in 817 as well as the occupancy of the queue 811 and the rate of change of the occupancy of the queue 811. All the values are sent into an array of information in storage 853. In this embodiment, the array of information in 853 may also include configuration values such as the pipe minimum (bandwidth guarantee mini), the pipe maximum (bandwidth limit maxi), and the pipe precedence (an integer=0, 1, 2, 3, ... ). Transmitted rates are then made available to a comparison mechanism 855 that computes aggregate rates and compares them to configured aggregate limits stored in 855. Then the information in 855 starts an algorithm, similar to the one discussed above, in a computer 857 that uses information from 853 and 855 to compute and store new transmit probabilities in an array 859. The new transmit probability values are sent by use of an information system with periodic trigger 861 through the logical partition 819 from the Control Plane 899 to the lookup mechanism 817 in Data Plane 898.

Figure 9:
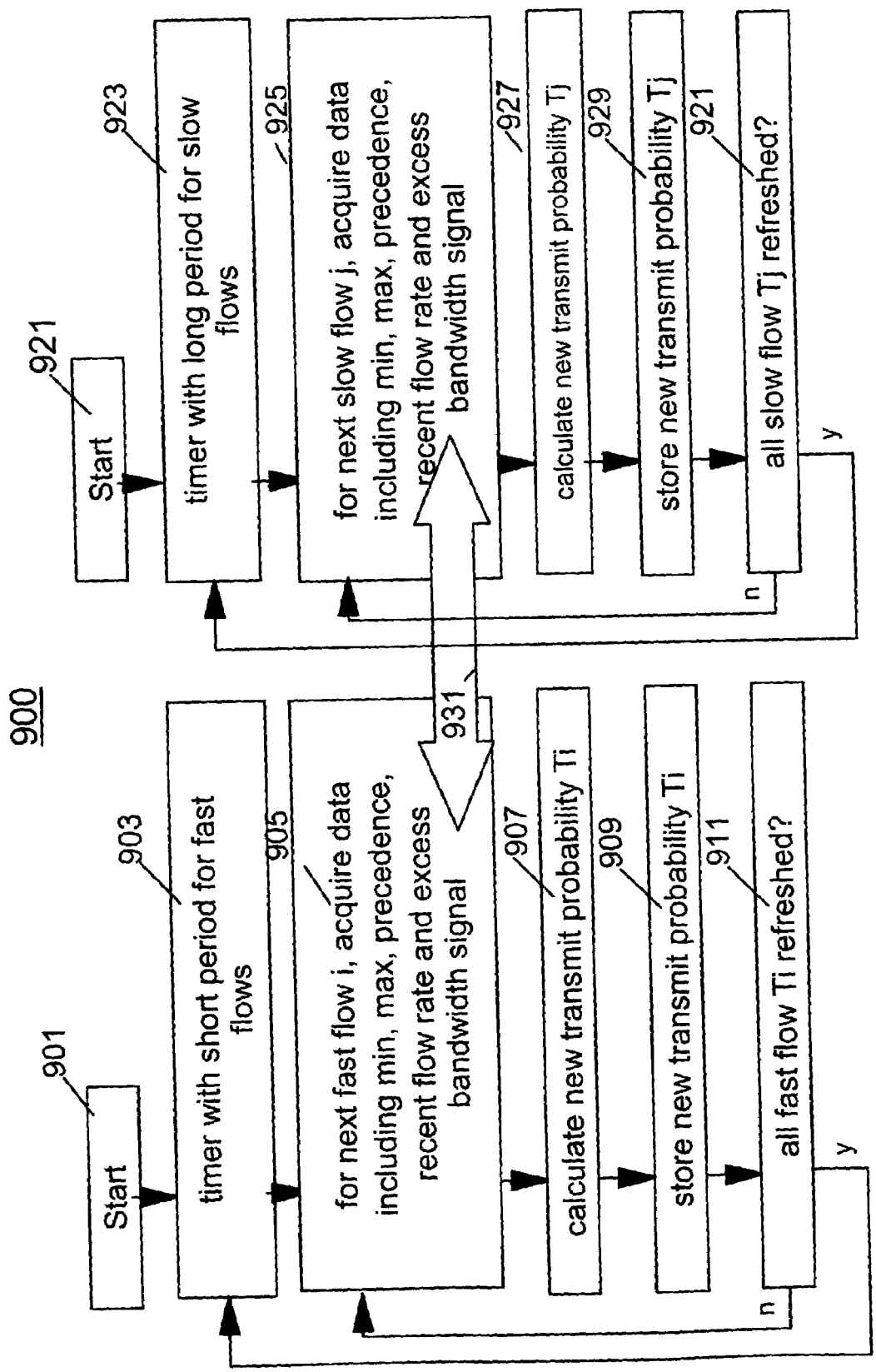
FIG. 9 depicts the relationship between flow control for high speed flows and flow control for low speed flow. The two systems are connected in a preferred embodiment by the sharing of congestion information in the form of an excess bandwidth signal.

FIG. 9 shows a logical flowchart 900 depicting processing for relatively fast flows and relatively slow flows. As used in this document fast flows means a data rate of approximately >1 Mbps, whereas slow flow means a data rate of approximately <1 Mbps. Preferably calculation of Ti for packets in relatively fast flows are all done in the data plane whereas calculation of Tj for packets in relatively slow flow are all done in the control plane. The partition of flow control for relatively few fast flows (say 2000) from flow control for many (say 16000) relatively slow flows allow the system to handle more flows than was hereto possible. For each fast flow number i the new value of each transmit probability Ti is calculated completely in the data plane, using the above described algorithm or similar ones. The system starts 901 and awaits the advance of a timer to the value of a short period 903. Then appropriate information is acquired 905 for fast flow i including an excess bandwidth signal that may be shared 931 among many fast flow calculations and even more numerous slow flow calculations. The information is fed 907 to an algorithm for refreshing Ti and the new Ti is stored 909. If the system does not complete the calculations in the present period for all flows, then the system branches to the calculation 905 for the next flow. If the system does complete the calculations in the present period, the system branches to the timer 903 to await the next period. The calculation for slow flows is mostly independent and carried out in parallel. For each slow flow number j the new value of each transmit probability Tj is calculated completely in the control plane. The system starts 921 and awaits the advance of a timer to the value of a long period 923. Then appropriate information is acquired 925 for slow flow i including an excess bandwidth signal that may be shared 931 among many slow flow calculations and fast flow calculations. The information is fed 927 to an algorithm, such as the one described above, for refreshing Tj and the new Tj is stored 929. If the system does not complete the calculations in the present period for all flows, then the system branches to the calculation 925 for the next flow. If the system does complete the calculations in the present period, the system branches to the timer 923 to await the next period. It should be noted the period of delay 923 for slow flows is much longer than the period of delay 903 for fast flows.

Figure 10:
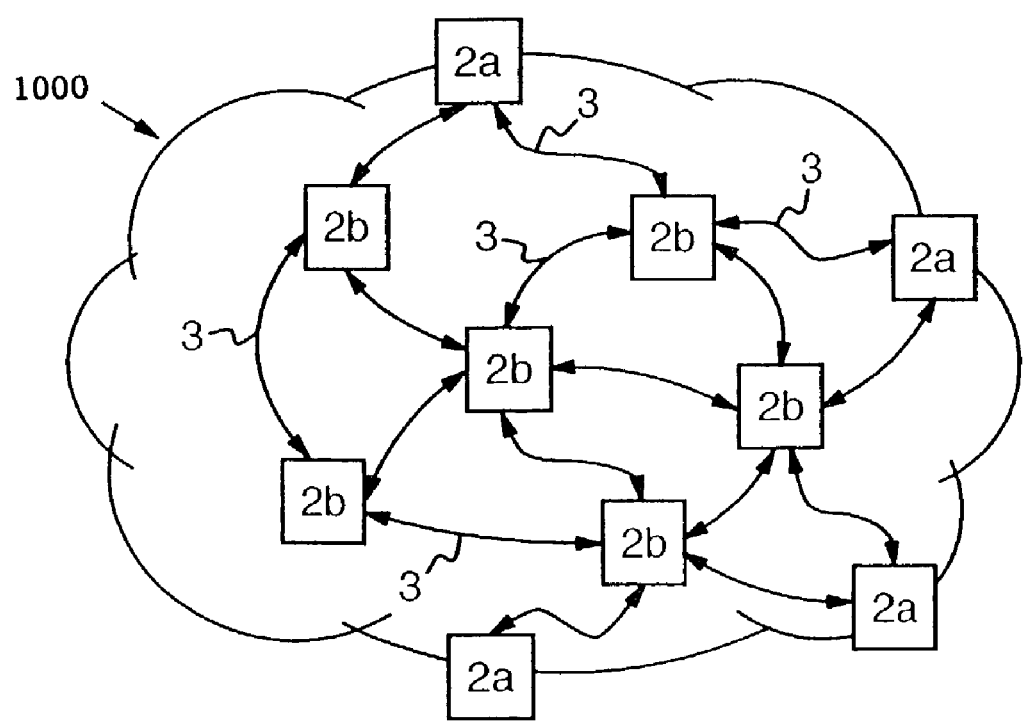
FIG. 10 shows block diagram of a communications network in which the present invention can be implemented.

FIG. 10 shows a portion of a communications network 1000 in which the present invention can be implemented. The network includes a plurality of network devices, such as edge routers 2a and non edge routers 2b interconnected by links 3. Preferably, the invention is implemented in network processors and control processor within the edge routers.

Figure 11:
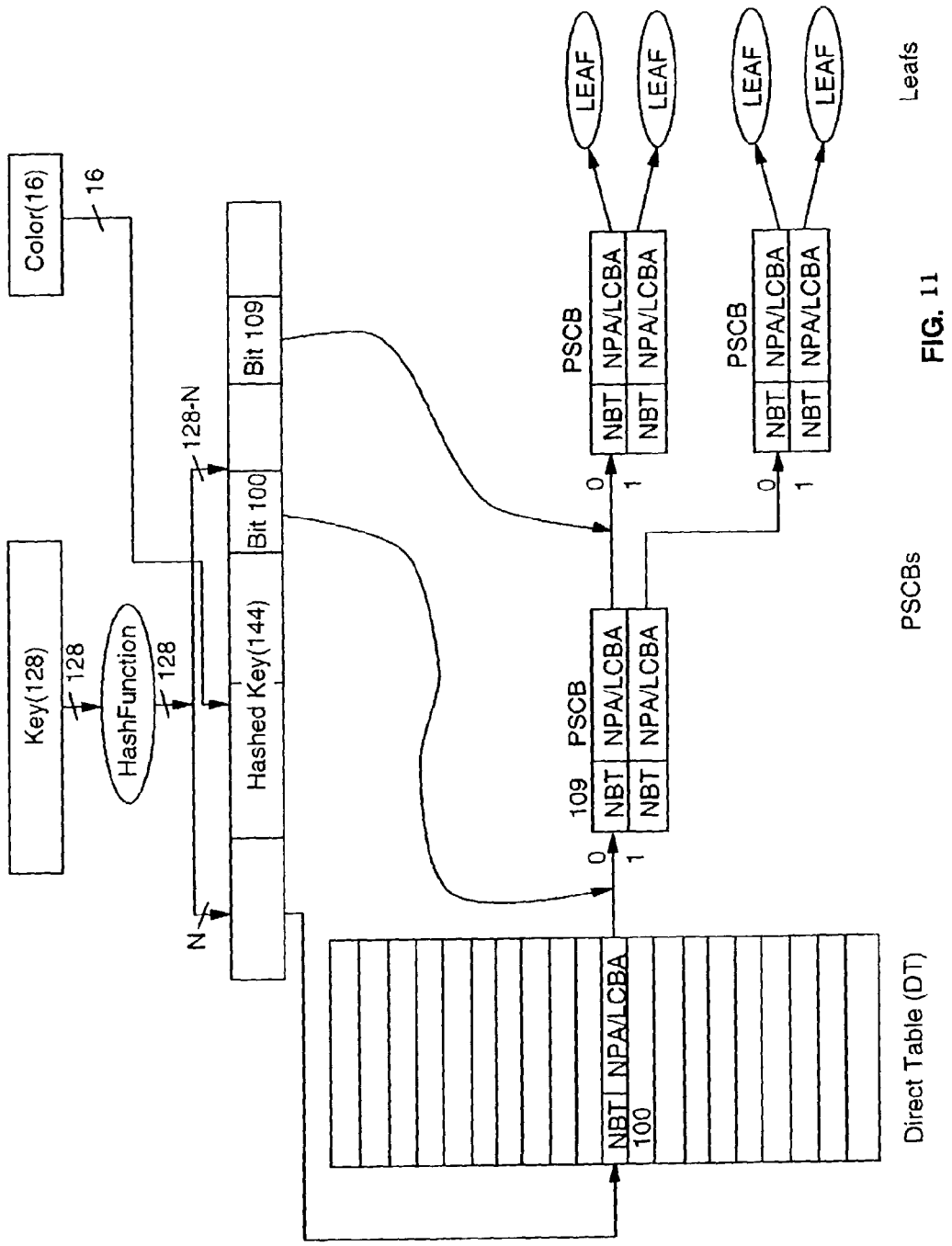
FIG. 11 shows a lookup mechanism that can be used in the present invention.

FIG. 11 shows a data structure for a Full Match (FM) Search Algorithm which can be used in the search or lookup mechanism described above. Details of the FM Search Algorithm and structure are set forth in the patent and patent application set forth above and incorporated in their entirety herein. Suffice it to say the structure includes a Direct Table (DT) partition into a plurality of entries. Each entry is operatively coupled to a Patricia tree having at least one node termed "Pattern Search Control Block" (PSCB) which terminates in a leaf. Of interest to this invention, flow control characteristics, such as transmit probability Ti, minimum bandwidth guarantee min I, maximum bandwidth, precedence etc., for each pipe are stored in a leaf. Thus when a packet belonging to a particular flow is received and the method set forth in the related application and/or patent is used to walk the tree, with portion of the packet, until a leaf is reached the flow information in the leaf can be retrieved and used to process the packet as set forth above.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A method for automatically allocating bandwidth among many pipes in a network comprising:
   (a) providing a first device in which a unit of information received is associated with one pipe of the many pipes;
   (b) determining predefined characteristics of said unit of information;
   (c) providing a second device (different from said first device) in which transmit probability Ti for each of the many pipes is being calculated, which includes the calculation of values of Ti for packets of previously established connections of the many of pipes, wherein said transmit probability Ti relates to discarding said unit of information, forwarding said unit of information, and delay in forwarding said unit of information based upon a comparison of said transmit probability Ti with a random number generated for a service event of said unit of information;
   (d) transmitting from said second device to said first device the transmit probabilities Ti so calculated; and
   (e) making, in said first device, a decision for said unit of information based upon the comparison of the transmit probability Ti with the random number for at least one of the many pipes.

2. The method of claim 1 wherein the predefined characteristics of packets are forwarded to the second device and are used to generate Ti.

3. The method of claim 2 wherein the first device includes a specialized computer.

4. The method of claim 3 wherein the specialized computer includes a network processor.

5. The method of claim 2 wherein the second device includes a general purpose computer.

6. The method of claim 1 wherein the unit of information includes packets.

7. The method of claim 1 wherein the unit of information includes instructions.

8. The method of claim 1 further including storing predefined information in said first device; and periodically sending stored information to the second device.

9. The method of claim 8 wherein the stored information relates
   to each pipe and includes
   a) the current transmit probability Ti;

b) measured values such as the current transmitted rate of pipe I;

c) occupancy of the processing queue and the rate of change of the occupancy of the processing queue; and d) various per-pipe configuration values including each pipe minimum bandwidth guarantee mini, each pipe maximum bandwidth limit maxi, and each pipe precedence (an integer=0, 1, 2, 3, . . . ).

10. The method of claim 1 wherein the decision includes comprises discarding said unit of information.

11. The method of claim 1 wherein the decision includes comprises delay in forwarding said unit of information.

12. The method of claim 1 wherein the decision includes comprises forwarding the unit of information.

13. The method of claim 1, further comprising: aggregating transmission rates of a set of pipes of the many pipes to produce a rate sum, comparing the rate sum with a maximum value, and reducing the Ti for the one pipe based on the rate sum exceeding the maximum value.

14. The method of claim 1 wherein the first device comprises a specialized computer.

15. The method of claim 1 wherein the second device comprises a general purpose computer.

16. A communication system including:

a plurality of flows to which packets are associated;

a random number generator for generating random numbers, wherein the random number generator generates random numbers for service events of Packets;

a special purpose computer including a memory for storing a Patricia tree data structure comprising flow characteristics information including transmit probability (Ti) for selected ones of the flows; and a flow control device that associates a packet with a flow and uses the Ti for the flow and a random number to generate a decision for said packet, wherein said packet may be associated with an established connection, wherein further the decision relates to discarding said packet, forwarding said packet, and delaying said packet based on a comparison of the Ti with a random number of the random number generator during a service event.

17. The communication system of claim 16 wherein the decision is to drop said packet based upon the comparison of Ti and the random number.

18. The communication system of claim 17 wherein the decision is to postpone action on said packet.

19. The communication system of claim 18 wherein the packet includes computer instructions.

20. The communication system of claim 16 wherein the special purpose computer includes a network processor.

21. The communication system of claim 16 further including a general purpose computer executing a first predefined algorithm containing variables representing characteristic information for selected ones of the flows and generating transmission probability Tj; and means for forwarding Tj to be stored in said Patricia tree data structure.

22. The communication system of claim 21 wherein the special purpose computer executes a second predefined algorithm containing flow characteristics associated with selected ones of the flow to generate Ti.

23. The communications systems of claim 22 wherein the first predefined algorithm and second predefined algorithm are identical.

24. The communication system of claim 16 wherein the communication system calculates new values for the transmission probability (Ti) for the selected ones of the flows based on an aggregation of the plurality of flows and a comparison of the aggregation with a maximum value of the aggregation.

25. A system, comprising:

a general purpose computer configured to calculate an aggregate value of transmission rates of a plurality of pipes, wherein the general purpose computer is configured to reduce a transmit probability (Ti) for a pipe of the plurality of pipes based on a comparison of the aggregate value with a maximum value of the bandwidth associated with the plurality of pipes; and a network processor configured to compare the transmit probability (Ti) with a random number for a packet of an allowed session of the pipe, wherein the network processor is configured to either transmit or discard the packet based on the comparison of the transmit probability with the random number.

* * * * *